(12) United States Patent
Plumley

(10) Patent No.: US 9,680,898 B2
(45) Date of Patent: Jun. 13, 2017

(54) COMMENT LINK TO STREAMING MEDIA

(71) Applicant: Margaret Plumley, San Carlos, CA (US)

(72) Inventor: Margaret Plumley, San Carlos, CA (US)

(73) Assignees: SONY CORPORATION, Tokyo (JP); SONY NETWORK ENTERTAINMENT INTERNATIONAL LLC, Los Angeles ( * ) Notice: Subject to any disclaimer, the term of this patent is extended or adjusted under 35 U.S.C. 154(b) by 200 days.

(21) Appl. No.: 14/486,542

(22) Filed: Sep. 15, 2014

(65) Prior Publication Data

US 2016/0080452 A1 Mar. 17, 2016

(51) Int. Cl.
*G06F 3/0484* (2013.01)
*H04L 29/06* (2006.01)
*G06F 17/24* (2006.01)
*G06F 17/30* (2006.01)
*H04L 29/08* (2006.01)

(52) U.S. Cl.
CPC ........ *H04L 65/604* (2013.01); *G06F 3/04842* (2013.01); *G06F 17/241* (2013.01); *G06F 17/30882* (2013.01); *H04L 67/02* (2013.01)

(58) Field of Classification Search
CPC .................................. G06F 3/04842
USPC ....................................... 715/723
See application file for complete search history.

(56) References Cited

U.S. PATENT DOCUMENTS

| 7,975,062 | B2 * | 7/2011 | Krikorian | G11B 27/034 709/231 |
| 8,059,546 | B2 * | 11/2011 | Pai | H04L 12/2801 370/236 |
| 8,473,550 | B2 * | 6/2013 | Nguyen | H04N 21/23103 709/204 |
| 2007/0168543 | A1 * | 7/2007 | Krikorian | G11B 27/034 709/231 |
| 2007/0198532 | A1 * | 8/2007 | Krikorian | G06Q 30/0273 705/14.69 |
| 2010/0030872 | A1 * | 2/2010 | Caleca | H04N 5/23206 709/219 |
| 2010/0122174 | A1 * | 5/2010 | Snibbe | G06Q 10/10 715/733 |
| 2011/0246945 | A1 * | 10/2011 | Caine | H04N 7/17318 715/835 |
| 2014/0026052 | A1 * | 1/2014 | Thorwirth | G06F 3/01 715/721 |

(Continued)

*Primary Examiner* — Reza Nabi
(74) *Attorney, Agent, or Firm* — Trellis IP Law Group, PC

(57) ABSTRACT

Embodiments generally relate to proving a method for an authenticated user of an item of streaming media content to create a shareable clip of a portion of the item. The method comprises using an interface on a first device to accept a first input from the authenticated user to define the clip; using the interface to accept a second input from the authenticated user to create a comment for the clip; creating an identifier for the clip, the identifier uniquely corresponding to the authenticated user and the defined clip; and sending the identifier and the comment to a second user in a form that includes a clickable link. If the second user clicks on the clickable link, the defined clip is streamed to the second user to play on a second device, independent of whether the second user is authorized to access the whole of the content.

8 Claims, 2 Drawing Sheets

(56) References Cited

U.S. PATENT DOCUMENTS

2014/0082666 A1\* 3/2014 Bloch .................... G11B 27/34
                                                                         725/37
2014/0122991 A1\* 5/2014 Achillopoulos .... G06F 17/2785
                                                                         715/230

\* cited by examiner

COMMENT LINK TO STREAMING MEDIA

BACKGROUND

Users of streaming media content, such as movies, TV shows, podcasts, or music, are often interested in sharing at least part of the experience with other people. One currently available option for such a user is to attach the entire item of streamed content as a file attachment to an e-mail message that is sent to the desired recipients, optionally including one or more comments in the message. Other options include uploading a link to the entire item of content to a hosting service operated by a third party for later access by those recipients, or "ripping" the item of content into another streaming service accessible to those recipients. If the media content were a simple Word file, rather than streaming media, the user would have the option of attaching a Word Comment to draw attention to a particular section of text in the file and emailing the entire file to a desired recipient, but in the streaming media cases of interest to the present invention, where video and/or audio information is involved, all of the above options make significant data transfer demands on the networks in question. The demands are unnecessarily large when, as is often the case, the user only wishes to share a small portion of the item of media content as being particularly interesting, funny, relevant etc.

Services such as YouTube do allow users to attach a link to a chosen point in an item of streaming media and send the result to a recipient, so that the recipient is encouraged to begin playback at that chosen point, but even in these cases, the entire item is referenced, and the recipient may—at least in theory—have access to the entire stream.

However, one common problem with all current options concerns copyright and authorization issues. Take the case where the initial user is legitimately accessing the item of steaming media content, for example after having subscribed to a service authorized by the creator or owner of the content to permit access to preselected, typically paying users. Unless the user in question knows that all of the desired recipients also have permission to play the item in question, sending the item as an attachment, a link upload, or via "ripping" is likely to violate the terms of the user's agreement with the streaming service, if the transfer is even technically possible. However, there may be many cases where the owner of the streamed content is willing to allow a partial "sharing" i.e. the sharing of a short clip, which increases exposure and awareness of the item for the public but stops short of unfair intellectual property duplication or theft.

There is therefore a need for a method that allows a subscriber to a streaming media service to create a clip of an item of content, and share that clip, and that clip alone, with other people regardless of whether those other people are subscribers or otherwise authorized to access and stream the entire item. Ideally, such sharing would occur with minimal effort by the user, and involve minimal interruption of the streaming of the entire item of content to the authorized user.

SUMMARY

Embodiments generally relate to methods for an authenticated user of an item of streaming media content to create a clip of a portion of the content smaller than the whole of the content, and share access to that clip with one or more other people of the user's choice.

In one embodiment, the method comprises using an interface on a first device to accept a first input from the authenticated user to define the clip; using the interface on the first device to accept a second input from the authenticated user to create a comment for the clip; creating an identifier for the clip, the identifier uniquely corresponding to the authenticated user and the defined clip; and sending the identifier and the comment from the first device to a second user in a form that includes a clickable link. If the second user subsequently clicks on the clickable link, the defined clip is streamed to the second user to play on a second device, independent of whether the second user is authorized to access the whole of the item of content.

In another embodiment, an interface is provided to a user on a first device to an authenticated user of an item of streaming media content. The interface is configured to accept a first input from the authenticated user to define a shareable clip of a portion of the content smaller than the whole of the content; accept a second input from the authenticated user to create a comment for the clip; create an identifier for the clip, the identifier uniquely corresponding to the authenticated user and the defined clip; and send the identifier and the comment to a second user in a form that includes a clickable link. If the second user subsequently clicks on the clickable link, the defined clip is streamed to the second user to play on a second device, independent of whether the second user is authorized to access the whole of the item of content.

In another embodiment, a tangible computer-readable storage device is provided, the device including one or more instructions executable by one or more processors for providing an interface on a first device to a user of an item of streaming media content. The interface is configured to accept a first input from the authenticated user to define a shareable clip of a portion of the item of content smaller than the whole of the content; accept a second input from the authenticated user to create a comment for the clip; create an identifier for the clip, the identifier uniquely corresponding to the authenticated user and the defined clip; and send the identifier and the comment to a second user in a form that includes a clickable link. If the second user subsequently clicks on the clickable link, the defined clip is streamed to the second user to play on a second device, independent of whether the second user is authorized to access the whole of the item of content.

A further understanding of the nature and the advantages of particular embodiments disclosed herein may be realized by reference to the remaining portions of the specification and the attached drawings.

DETAILED DESCRIPTION OF EMBODIMENTS

Embodiments described herein enable a user to quickly and easily create a shareable clip of an item of streaming media content, and send a link to one or more recipients allowing that specific clip to be accessed. Embodiments generally relate to providing an interface on the display screen of a device such as a tablet computer, a cell phone, or a laptop computer. The interface accepts inputs from the user to define the boundaries of the clip, and to optionally add comments for the clip. The interface then carries out a sequence of steps necessary to enable desired recipients to access the defined clip, along with any comments added by the user. Examples of streamed content from which clips may be created include movies, TV or radio shows, podcasts, music, sports event coverage, concerts, and political event coverage. The current invention may be particularly useful to the user of live streaming media, but may also be used when items of pre-recorded media are streamed.

In some embodiments, the user may be viewing and/or listening to the streamed item of content on one device, such as a TV or laptop computer, and decide that a particular section—a dance sequence for example, or the telling of a particularly funny joke—would be of interest to a particular relative or friend, and should be shared with that person without delay. The user may then use an interface provided on the display of either the same device or another device to define the clip of interest by its start and end points. The user may then use the interface to add a comment for that clip if desired; to select the person or persons with whom the user wishes to share the clip; and to send a message to that person or persons, the message containing a clickable link, uniquely corresponding to the clip of interest. If and when a recipient of the message clicks on the link, the only portion of the original item of content that is accessed by and streamed to that recipient is the clip.

Figure 1:
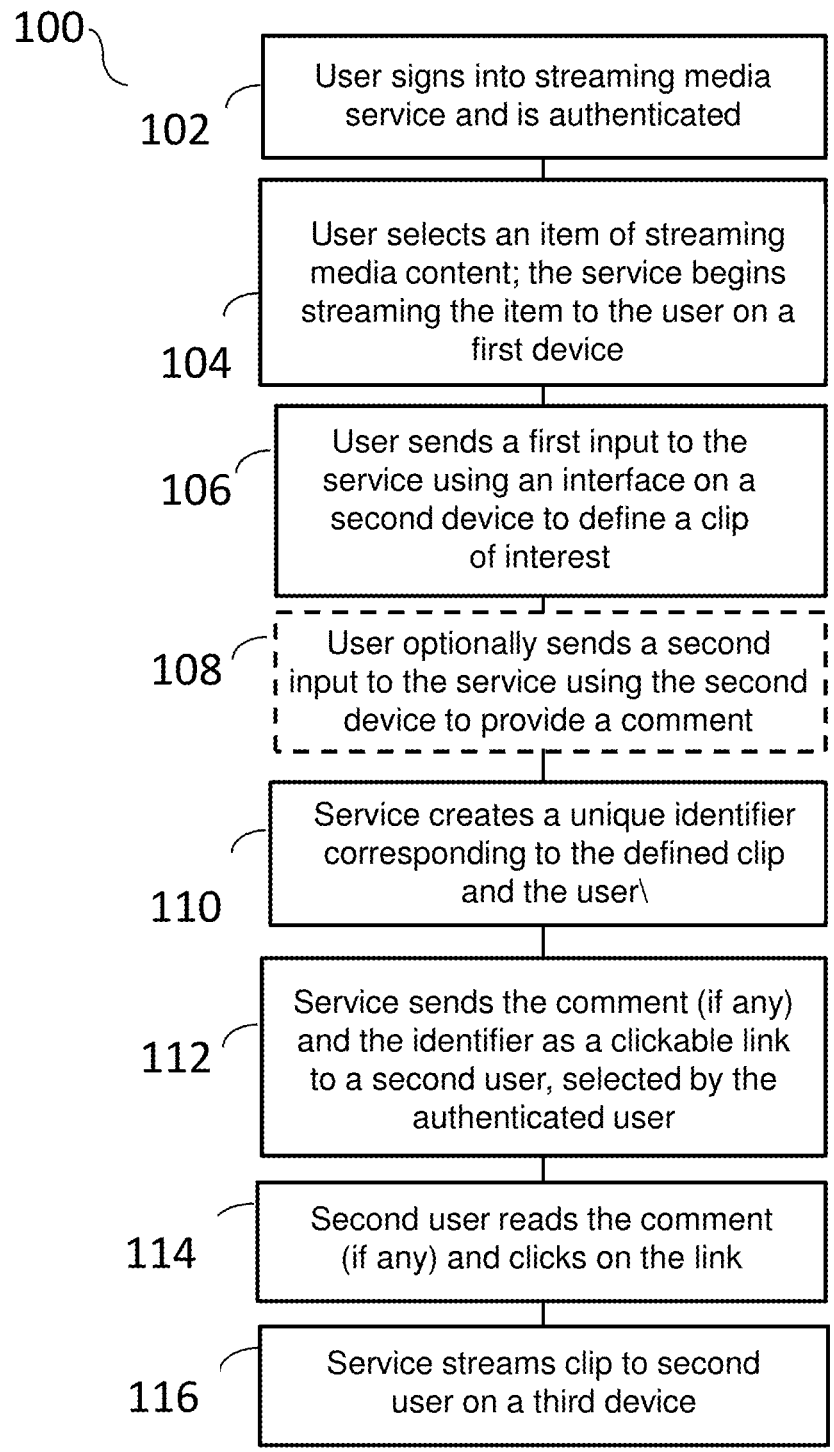
FIG. 1 is a flowchart illustrating the steps required to allow the creation and sharing of a clip of an item of streaming media according to some embodiments.

FIG. 1 is a flowchart illustrating the steps of a method 100 required to allow the creation and sharing of a clip of an item of streaming media according to some embodiments. At step 102, a first user signs into streaming media service and is authenticated by that service. At step 104, the authenticated first user selects an item of streaming media content, and the item is streamed to that user on a first device. The authentication and the selection may, but need not necessarily, have occurred on that same first device. At this point, the service is aware of the identity of the first user, the selection of the item, and the streaming of the item. The first device may, for example, be a TV, a game console, a music player, etc. At step 106, on deciding that a particular portion of the item may be of particular interest to a second user, the first user accesses an interface provided by the streaming media service on a second device, which may be the same device as the first device or a different one, and uses the interface to send a first input to the service that defines a clip of interest. In some cases, the interface may be a web interface. The second device may, for example, be a tablet computer, or a smart phone. As noted above, in some cases, the second device may be the same device as the first device.

In some cases the first input may explicitly include a start point and an end point of the clip. The start and end points may be associated with start and end time stamps. In some cases, the first input may include a start point and an indication of the desired duration of the clip, from which the service may infer the end point. In yet other cases, the first input may include an end point and an indication of the desired duration of the clip, from which the service may infer the start point. In all cases, the duration of the clip must be smaller than the duration of the entire item of content. In some embodiments, the service may further restrict the user to be able to define clips of duration smaller than some predetermined value, significantly smaller than that of the entire item. Such restrictions avoid the sharing of unreasonably large portions of the item, for the benefit of the content creator and/or owner, and also reduce the demands on the network over which streaming to the second user must occur.

At step 108, the user optionally sends a second input to the service using the second device to provide a comment relating to the defined clip. In some cases step 108 may occur before step 106. In some cases, a pre-composed comment may be automatically provided when step 106 occurs. One example of such a pre-composed comment is "Hi! I thought you might enjoy this clip; you can link to it by clicking on this:"

In some embodiments, step 108 may occur before step 106, meaning that the user may provide a comment before inputting information defining the clip with which that comment should be associated.

At step 110, the media streaming service creates an identifier, or GUID (globally unique identifier), uniquely and directly associated with the clip defined by the authenticated user, and with that user. In some cases, the identifier may be explicitly and directly associated with the start and end points of the clip. In all cases, the GUID allows the service to keep track of exactly which clips are created and shared by that user.

In some cases, step 110 may occur immediately after step 106, before step 108 occurs, if step 108 occurs at all.

At step 112, the service sends the comment (if any) as a readable piece of text, and the identifier as a clickable link, to a second user, selected by the authenticated user. The transmission may occur as an email, a text, an instant message, a dashboard message, or in some other form. The selection of the second user may occur in response to a third input from the authenticated user, identifying the desired recipient of the clip and comment. While the words "clickable" and "clicks" are used throughout this specification, it should be understood that the terms are intended to include other forms of deliberate selection by the recipient, such as a finger touch on an icon on a touchscreen, an audio command etc.

At step 114, which may occur almost immediately, or after some delay, the second user, the recipient of the clickable link, reads the comment (if any) and clicks on the link. If and when step 114 occurs, step 116 follows, at which the service streams the selected, defined clip to the second user. The service does not need to check whether the second user is authenticated to access the entire item of content, as only the clip is made accessible. Therefore, the first user may be confident that any desired recipient, selected to be the second user, should be able to play the defined clip.

In some embodiments, the clickable link may be configured to expire after a predetermined time, or after the clip has been played by the second user for a predetermined number of times.

In some embodiments, the interface may be configured to allow the authenticated user to record an audio comment instead of or in addition to the written comment. In these cases, the audio file may be embedded into the message sent to the second user, or otherwise conveyed so that the second user is able to listen to the comment.

Figure 2:
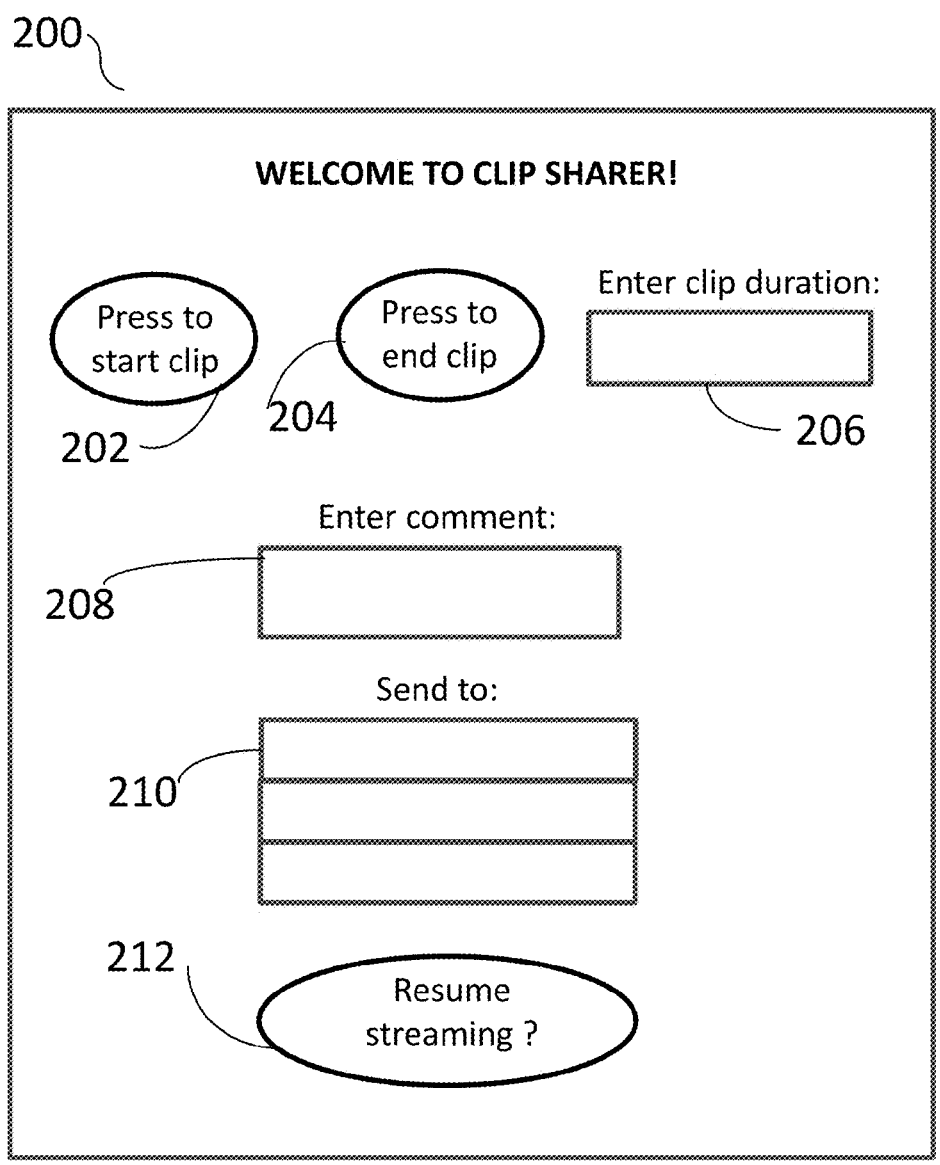
FIG. 2 shows a screen display of an interface, according to some embodiments of the current invention.

FIG. 2 shows a screen display 200 of an interface for some embodiments, at the point where the user has already successfully signed in, and is watching and/or listening to the selected item of content on a first device. In the case illustrated, the interface is displayed on a second device, different from the first device. The graphical interface includes button 202 which allows the user to select the start point of the desired clip, the service noting the time at which button 202 is selected and making an association with the corresponding point in the media item being streamed to the authenticated at that same instant. Button 204 similarly allows the user to select the end point of the desired clip, the service noting the time at which button 204 is selected and making an association with the corresponding point in the media item being streamed to the authenticated at that same instant. Text box 206 is present to allow the user to enter a desired time duration for the clip as an alternative to selecting either one (but not both) of buttons 202 and 204. In some cases, text box 206 may be replaced by a row of radio buttons adjacent possible standard choices of time duration, such as 30 s, 1 minute, 2 minutes etc. Many other possibilities, well known in the art of graphical user interfaces, exist to allow the user to select a time. One example is a pull down menu with a series of selectable time durations.

Text box 208 allows the user to enter a written comment to be associated with the desired clip.

In some embodiments, not shown, the interface may include a button linked to functionality that allows the user to record a voice comment instead of, or in addition to, a written comment.

In some embodiments, not shown, the interface may include input options that allow the user to use a voice command to select the start and end points of the desired clip.

Button 210 allows the user to select one or more desired recipients of the defined clip. In some cases, this may be achieved with a text box in which the user enters the desired recipient's email address. In some cases, if the service has access to a list of the user's contacts with their associated email addresses, the user may simply enter the person's name or other ID, and the service will look up the corresponding email address.

In some embodiments, the streaming service may automatically pause the streaming of the item to the authenticated user when that user accesses the interface on the second device, allowing the user to input the start point for example, and then resuming streaming until the user inputs the end point. The service may pause the streaming again while the user enters a comment and while the desired recipient is selected. This allows the user to create the clip and make it sharable without having to either miss any portions of the streamed content, or manually pause, rewind etc. In such cases, button 212 allows the user to indicate that there are no more desired recipients to be selected, so that streaming may resume.

Embodiments described herein provide various benefits. In particular, embodiments enable a user to quickly and easily share clips of items of streaming media with one or more others, without having to break any terms of agreement with the service provider and with confidence that those others will be granted access to that clip. These benefits may be especially valuable to users located remotely from the people they would like to share clips with, those without very high speed internet connections etc.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

The word "interface" used throughout this specification should be understood to mean a user interface through which the user and the streaming service may communicate.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for an authenticated user of an item of live streaming media content played on a first device to create a shareable clip of a portion of the item of live streaming media content smaller than the whole of the item, the method comprising:

using a web interface on a second device to accept a first input from the authenticated user to define the clip, the first input comprising a start point and an end point for the clip, the difference between the start point and the end point being smaller than or equal to a predetermined value;

using the web interface on the second device to accept a second input from the authenticated user to create a comment for the clip;

creating an identifier for the clip, the identifier uniquely corresponding to the authenticated user and the defined clip; and sending the identifier and the comment from the second device to a second user in a form that includes a clickable link;

wherein when the second user clicks on the clickable link, the defined clip is streamed to the second user to play on a third device, independent of whether the second user is authorized to access the whole of the item of content; and wherein the clickable link expires either after a predetermined time or after the clip has been played by the second user for a predetermined number of times.

2. The method of claim 1 wherein sending the identifier and the comment to a second user comprises generating and sending an email message.

3. The method of claim 1 wherein the third device is a different device from the first device.

4. The method of claim 1 wherein the second device is a different device from the first device.

5. A web interface provided on a second device to an authenticated user of an item of live streaming media content played on a first device, the interface configured to:

accept a first input from the authenticated user to define a shareable clip of a portion of the content smaller than the whole of the content, the first input comprising a start point and an end point for the clip, the difference between the start point and the end point being smaller than or equal to a predetermined value;

accept a second input from the authenticated user to create a comment for the clip;

create an identifier for the clip, the identifier uniquely corresponding to the authenticated user and the defined clip; and send the identifier and the comment to a second user in a form that includes a clickable link;

wherein tf-when the second user clicks on the clickable link on a third device, the defined clip is streamed to the second user to play on the third device, independent of whether the second user is authorized to access the whole of the content; and wherein the clickable link expires either after a predetermined time or after the clip has been played by the second user for a predetermined number of times.

6. The interface of claim 5 wherein sending the identifier and the comment to a second user comprises generating and sending an email message.

7. A non-transitory tangible computer-readable storage device including one or more instructions executable by one or more processors for providing a web interface on a second device to a user of an item of live streaming media content played on a first device, wherein the web interface is configured to:

accept a first input from the authenticated user to define a shareable clip of a portion of the item of content smaller than the whole of the content, the first input comprising a start point and an end point for the clip, the difference between the start point and the end point being smaller than or equal to a predetermined value;

accept a second input from the authenticated user to create a comment for the clip;

create an identifier for the clip, the identifier uniquely corresponding to the authenticated user and the defined clip; and send the identifier and the comment to a second user in a form that includes a clickable link;

wherein when the second user clicks on the clickable link on a third device, the defined clip is streamed to the second user to play on the third device, independent of whether the second user is authorized to access the whole of the item of content; and wherein the clickable link expires either after a predetermined time or after the clip has been played by the second user for a predetermined number of times.

8. The storage device of claim 7 wherein sending the identifier and the comment to a second user comprises generating and sending an email message.

* * * * *